J. K. Derby. Hollow Auger.

116418

PATENTED JUN 27 1871

Witnesses:
John Becker
Wm. H. C. Smith

Inventor:
J. K. Derby

PER
Attorneys.

16,418

UNITED STATES PATENT OFFICE.

JOHN K. DERBY, OF JAMESTOWN, NEW YORK, ASSIGNOR TO DANIEL A. SEYMOUR AND ELLIS B. STILSON, OF SAME PLACE.

IMPROVEMENT IN REAMERS.

Specification forming part of Letters Patent No. 116,418, dated June 27, 1871.

*To all whom it may concern:*

Be it known that I, JOHN K. DERBY, of Jamestown, in the county of Chautauqua and State of New York, have invented a new and useful Improvement in Reamers; and I do hereby declare that the following is a full, clear, and exact description thereof, which will enable others skilled in the art to make and use the same, reference being had to the accompanying drawing forming part of this specification, in which—

Figure 1:
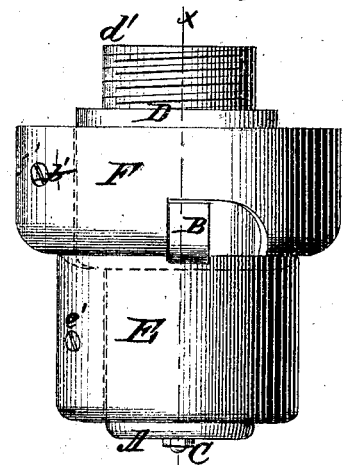
Figure 2:
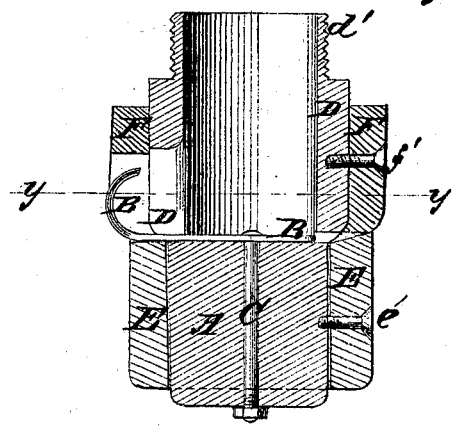
Figure 3:
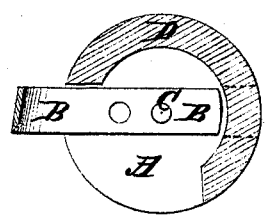

Figure 1 is a side view of my improved reamer adjusted for boring large holes. Fig. 2 is a detail longitudinal section of the same taken through the line $x\ x$, Fig. 1. Fig. 3 is a detail cross-section of the same taken through the line $y\ y$, Fig. 2.

Similar letters of reference indicate corresponding parts.

My invention has for its object to furnish an improved reamer, which shall be so constructed and arranged that it may be easily adjusted for boring different-sized holes, and which shall be neat, compact, and simple in construction, and will require but a comparatively small amount of power to operate it; and it consists in the construction and combination of various parts of the reamer, as hereinafter more fully described.

A is the leader which follows the hole which is to be enlarged, and to the rear end of which is attached the knife or cutter B, which is secured in place by a bolt, C, which passes through the leader A longitudinally, and through one or the other of the holes in the knife B, so that the knife can be conveniently set out or in to bore a larger or smaller hole, as may be desired. The outer or cutting part of the knife B is curved, as shown in Fig. 2, so that it may make a clean cut. Upon the rear end of the leader A is formed, or to it is attached, a hollow block, D, which is notched at and in front of the knife B to allow the chips to pass freely into the interior of the said block, whence they are carried out through the hollow barrel or shaft of the reamer by a worm, which worm is not shown in the drawing. Upon the rear end of the hollow block D is formed a round tenon, $d'$, having a screw-thread formed upon it for screwing into the barrel or shaft of the auger. E is a detachable collar which fits upon the leader A, and is secured by a set-screw, $e'$, so that it may be conveniently removed and replaced by a larger or smaller collar, according to the size of the hole to be followed out, and into which hole it should fit accurately so as to hold the reamer steady while at work. F is a detachable collar which fits upon the hollow block D, and has a hole or notch formed in its side for the knife B and the passage of the chips, and is secured to said hollow block D by a set-screw, $f'$, so that it may be conveniently removed, and replaced with a larger or smaller collar according as a larger or smaller hole is to be bored. The collar F should fit the hole being bored, so as to hold the reamer steady while at work and insure the boring of a perfectly true hole.

Having thus described my invention, I claim as new and desire to secure by Letters Patent—

1. The combination of hollow guides E F and the notched and tubular block D with the curved cutter B and solid block A, as and for the purpose specified.

2. The reaming-cutter B having a shank with several holes therein arranged detachably on the solid block A, and held thereto by a bolt, C, as described, so as not only to be held firmly in place, but to admit of a radial adjustment for the purpose of increasing or lessening the limit of its throw.

3. In combination with the hereinbefore-described reaming-cutter B and solid block A, the blocks D F, made in tubular form, and with notches or recesses to receive the chips, as specified.

4. The arrangement, upon a leader, A, and block D, of detachable tubular guides E F, to enable the same tool-stock to be used in boring different-sized holes.

JOHN K. DERBY.

Witnesses:
   JAMES I. FOWLER,
   ED. RE. BOOTEY.